Dec. 17, 1935.  D. C. ROCKOLA  2,024,187
SCALE
Filed March 7, 1931    7 Sheets-Sheet 1
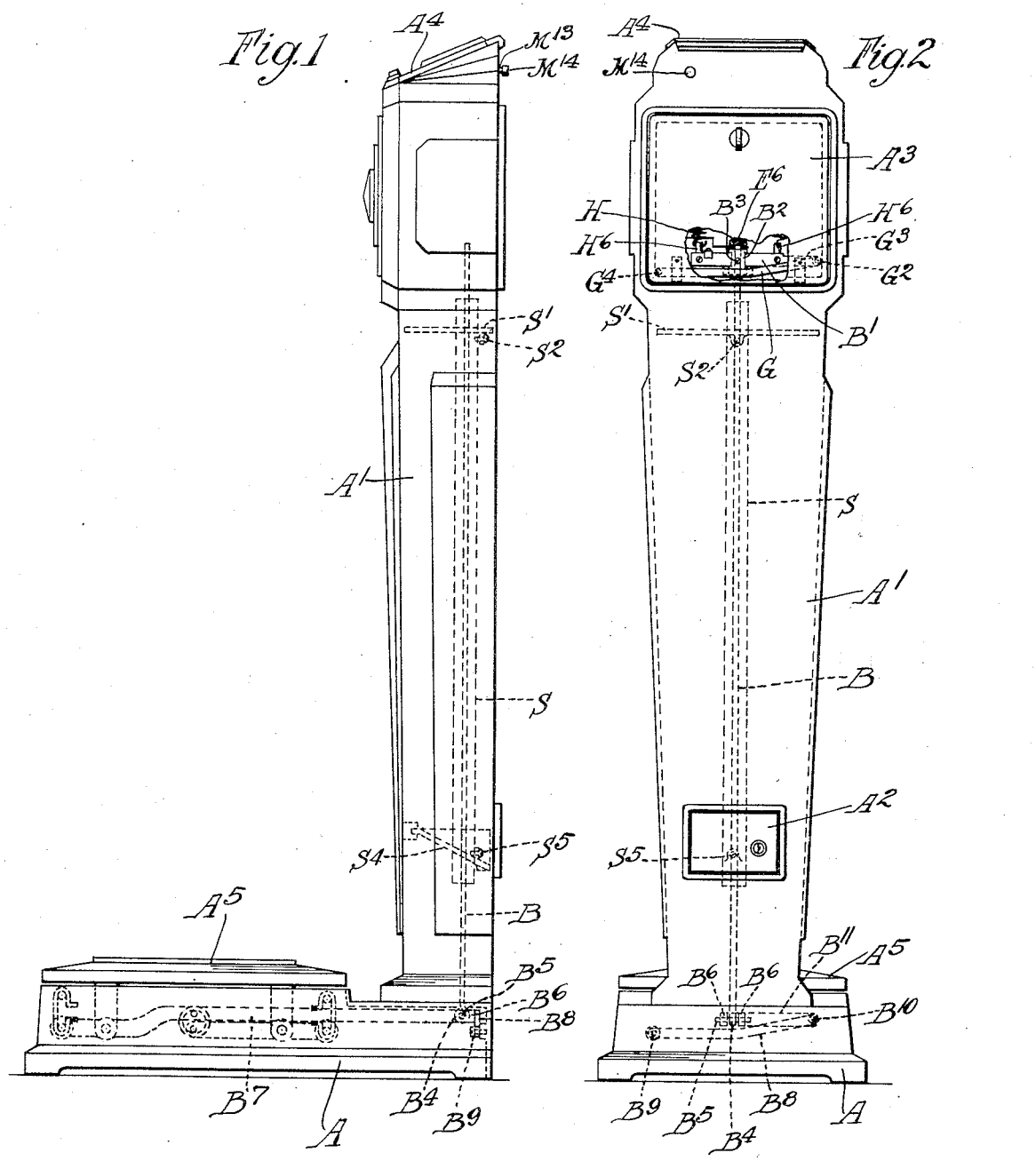
Inventor
David C. Rockola
by Parker & Carter
Attorneys.

Dec. 17, 1935.  D. C. ROCKOLA  2,024,187
SCALE
Filed March 7, 1931   7 Sheets-Sheet 4
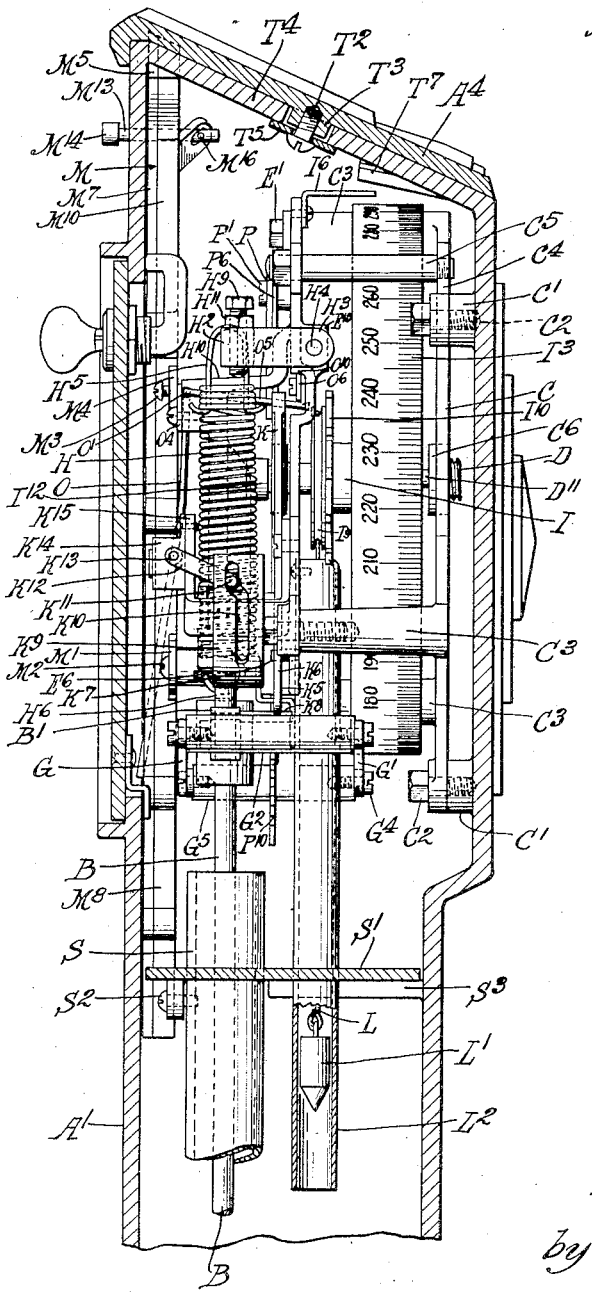
Fig.5
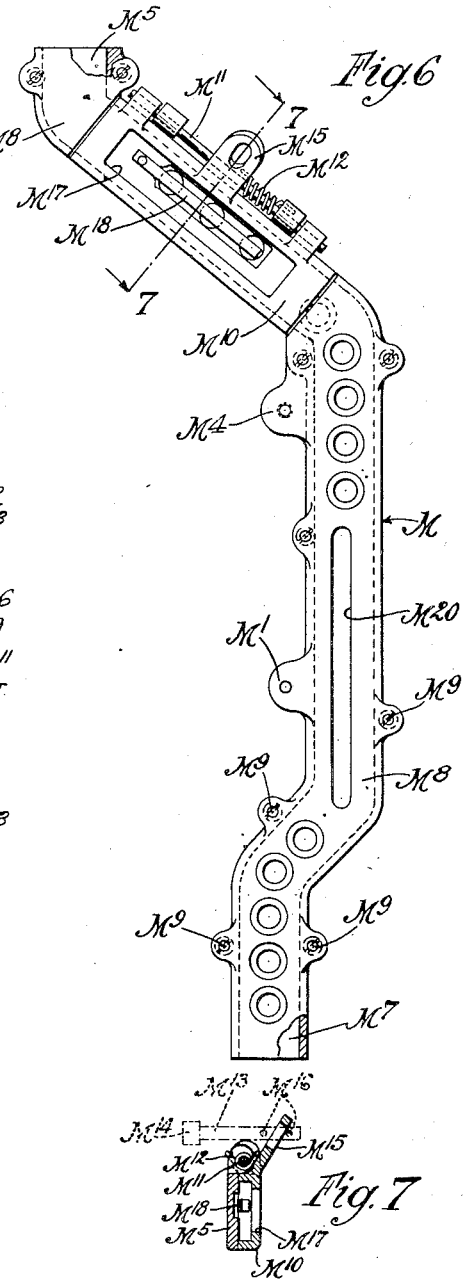
Fig.6
Fig.7
Inventor
David C. Rockola
by Parker & Carter
Attorneys.

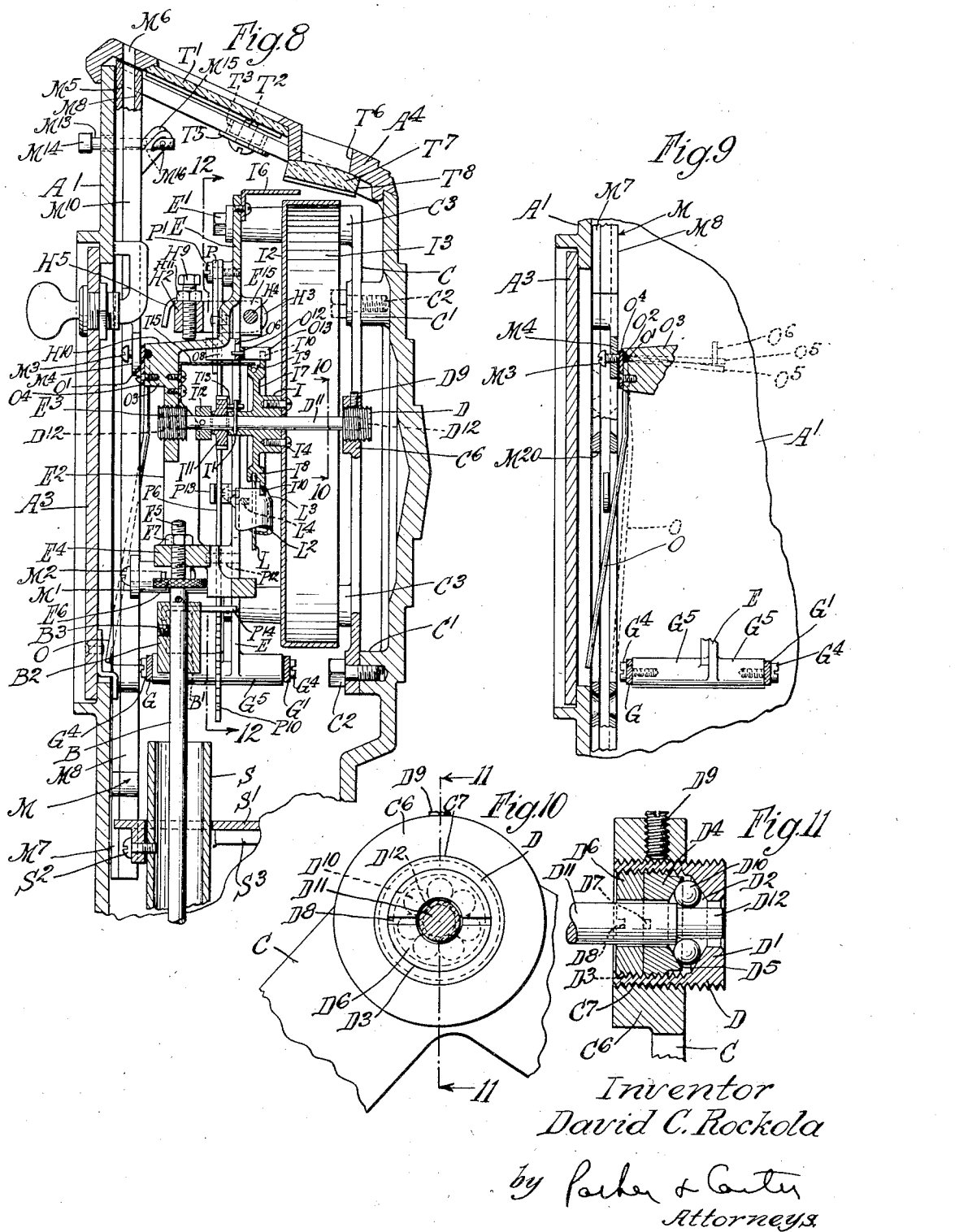

Dec. 17, 1935.      D. C. ROCKOLA      2,024,187
SCALE
Filed March 7, 1931      7 Sheets-Sheet 6
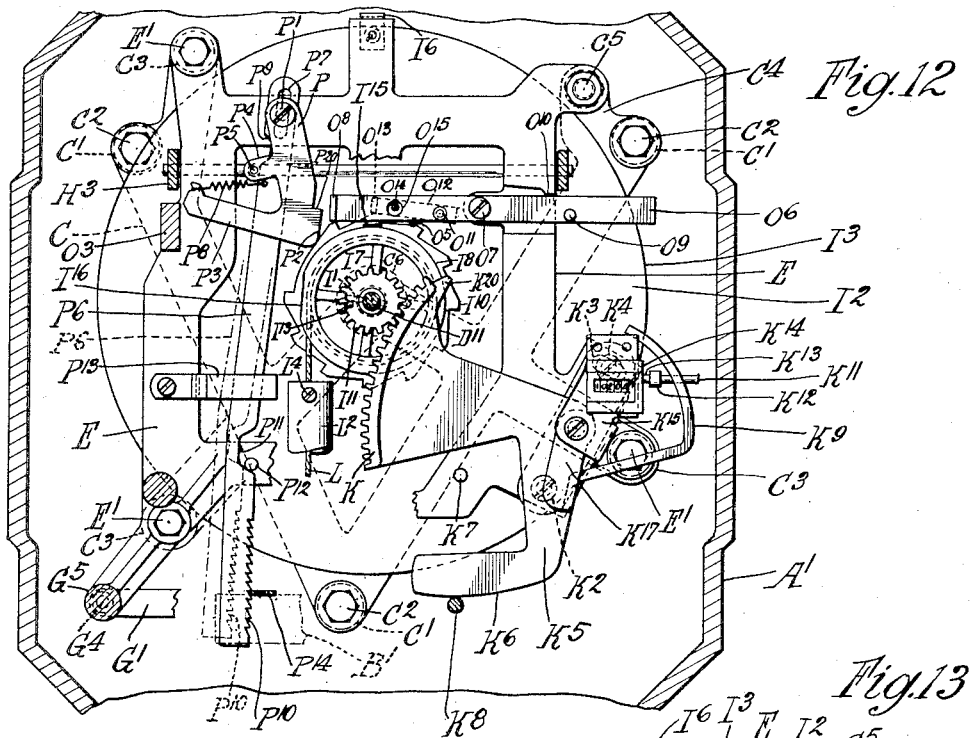
Fig.12
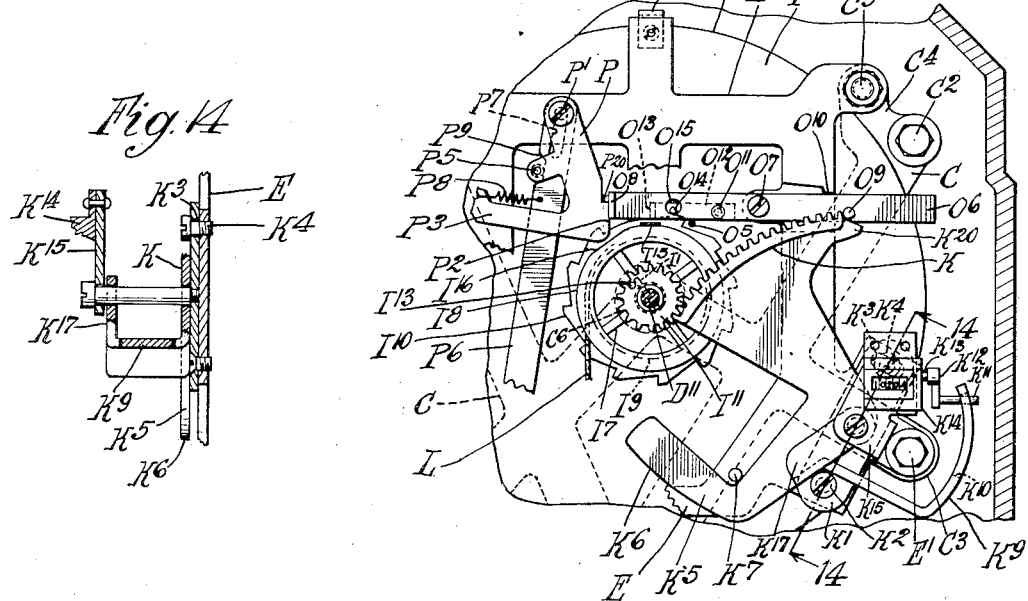
Fig.13
Fig.14
Inventor
David C. Rockola
by Parker & Carter
Attorneys.

Dec. 17, 1935.     D. C. ROCKOLA     2,024,187
SCALE
Filed March 7, 1931     7 Sheets-Sheet 7
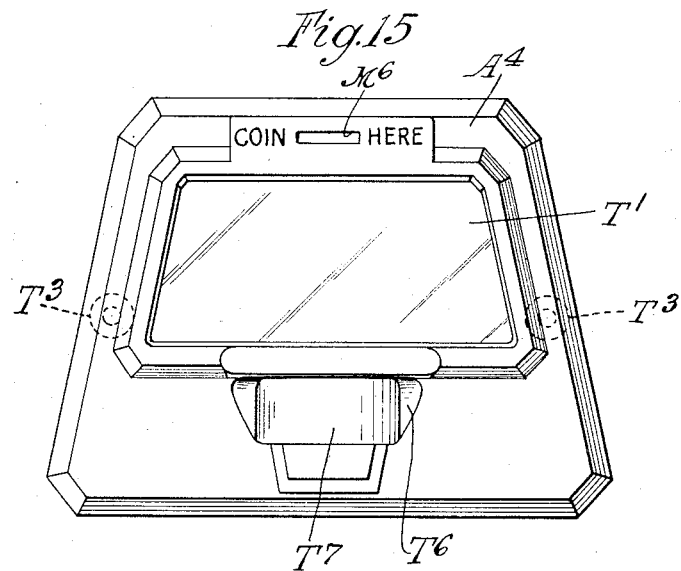
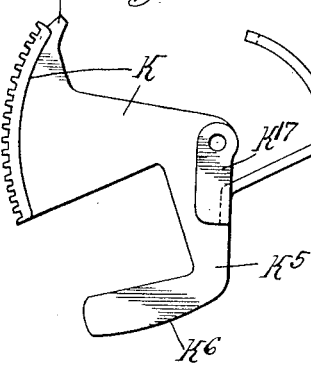
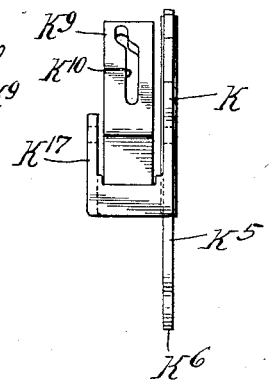
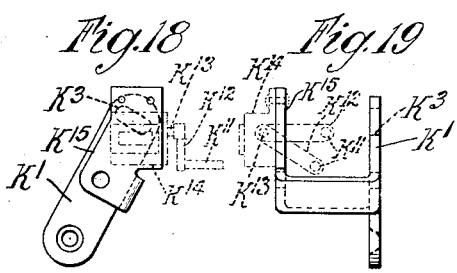
Inventor
David C. Rockola
by Usher & Carter
Attorneys Patented Dec. 17, 1935

2,024,187

UNITED STATES PATENT OFFICE 2,024,187

SCALE

David C. Rockola, Chicago, Ill.

Application March 7, 1931, Serial No. 520,792

4 Claims. (Cl. 265—68)

My invention relates to a scale mechanism and housing means therefor, and has for one purpose the provision of a commercial coin in the slot scale. Another object is the provision of improved housing means for such scales. Another object is the provision of improved equalizing means for scales. Another object is the provision of registering means for registering the passage of coins. Another object is the provision of an improved trip mechanism. Other objects will appear from time to time in the course of the specification and claims.

I illustrate my invention more or less diagrammatically in the accompanying drawings, wherein—

Figure 1 is a side elevation;

Figure 2 is a rear elevation;

Figure 5 is a section on the line 5—5 of Figure 3;

Figure 6 is a detail of the coin chute;

Figure 7 is a section on the line 7—7 of Figure 6;

Figure 8 is a section on the line 8—8 of Figure 3;

Figure 9 is a section on the line 9—9 of Figure 3;

Figure 10 is a section on the line 10—10 of Figure 8;

Figure 11 is a section on the line 11—11 of Figure 10;

Figure 12 is a section on the line 12—12 of Figure 8, showing the parts in somewhat different position;

Figure 13 is a similar section illustrating the parts in still a different position;

Figure 14 is a section on the line 14—14 of Figure 13;

Figure 15 is a plan view of the top plate; and

Figure 3:
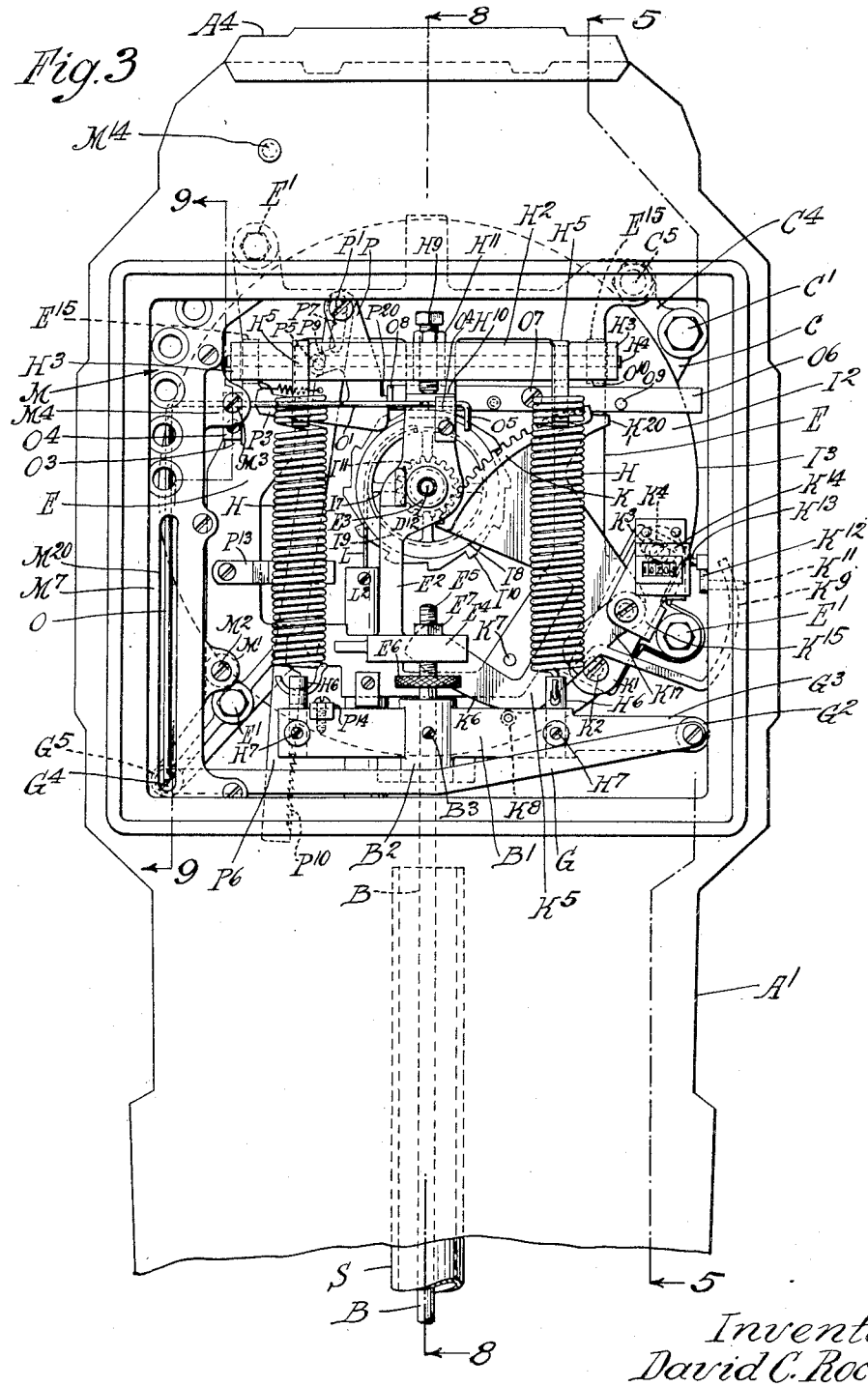
Figure 3 is a rear view on an enlarged scale with the back cover removed.

Figures 16, 17, 18, and 19 are details.

Like parts are indicated by like symbols throughout the specification and drawings.

Referring to the drawings, A generally indicates any suitable base portion from one end of which upstands the vertical housing member generally indicated as $A^1$ which may for example have a lower door or closure $A^2$, an upper rear door or closure $A^3$ and a top plate generally indicated as $A^4$. $A^5$ indicates a weighing or scale platform upon which the user stands and which is connected, by the mechanism below set out, with the later described weight recording mechanism.

B generally indicates a rod or tension member whereby the weight upon the platform $A^5$ acts upon the weighing mechanism. At its upper end this rod penetrates the parts $B^2$ of the bar $B^1$ and is secured thereto for example by the set screw $B^3$. At its lower end the bar B is formed with an eye $B^4$ through which passes the pin $B^5$ which in turn passes through the ears $B^6$ which form part of a linkage generally indicated as $B^7$, the details of which form of themselves no part of the present invention. It will be understood, however, that downward pressure upon the platform $A^5$ will cause the rod B to move downwardly, through depression of said linkage. However, it is important to prevent lateral movement of the bar B and I therefore provide an equalizing lever $B^8$, pivoted at one end as at $B^9$ to the casting or base A. At its other end it is pivoted as at $B^{10}$ to a lateral extension $B^{11}$ from the linkage $B^7$. It will therefore be understood that lateral movement of the rod B is substantially eliminated, except for the lateral movement caused by the very slight arc through which the lever B rotates.

Figure 4:
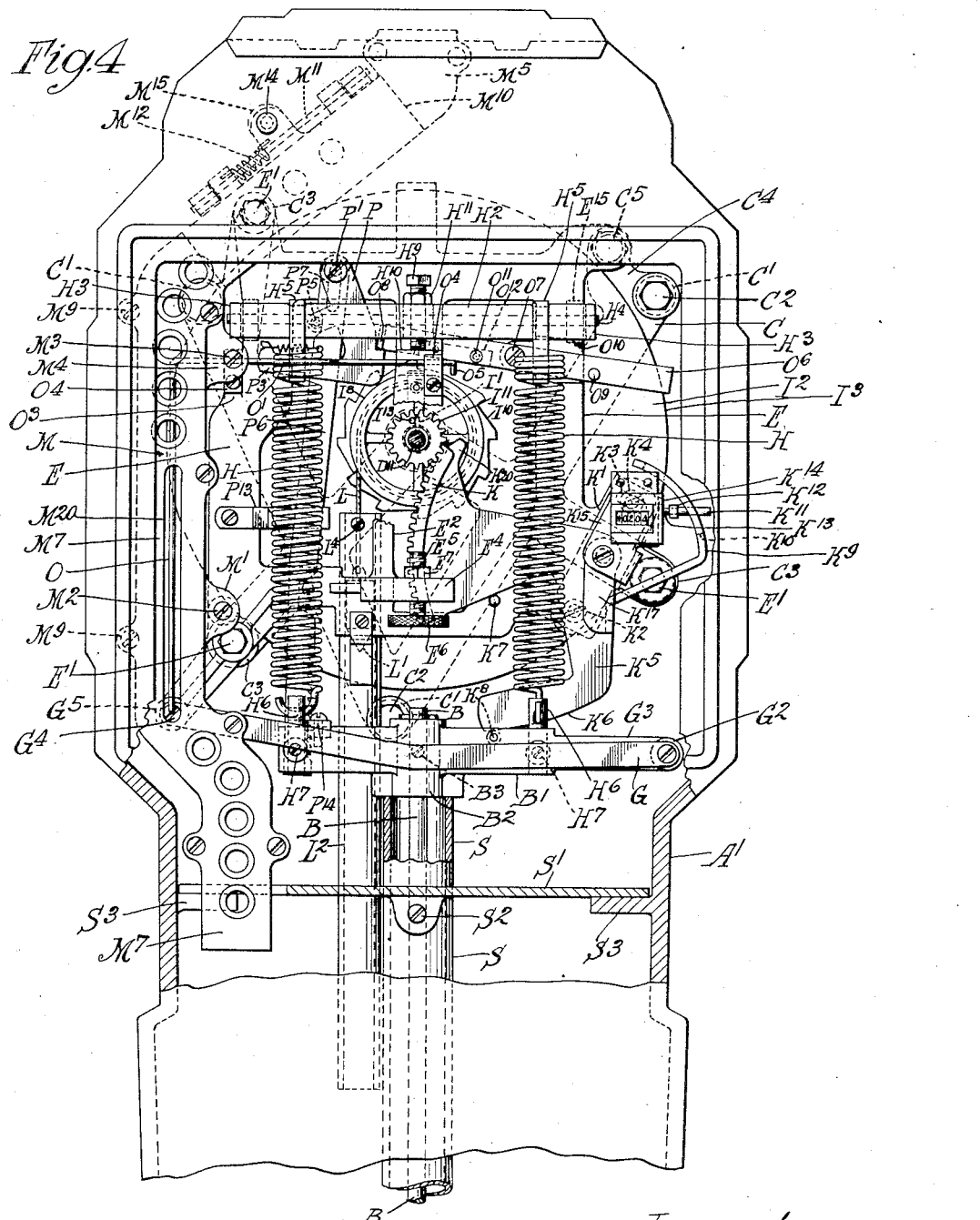
Figure 4 is a view similar to Figure 3 with parts broken away and with the scale mechanism in a different position.

Considering now the weighing mechanism, which is housed in the upper portion of the upstanding housing $A^1$, I illustrate a general supporting cage for the scale mechanism. This cage may for example be formed of two parts, for example castings, a forward part and a rear part. I illustrate for example in Figure 5 the front part generally indicated as C. It is secured to bosses $C^1$ on the interior of the main housing or casting $A^1$. Three of these bosses may be employed, as shown in Figure 4. The member C may be secured to the bosses $C^1$ as by the screws $C^2$. The member C is herein shown as composed of webs, which connect the three rearwardly extending bosses $C^3$. Adjacent one of the points of attachment to one of the bosses $C^1$, as shown at the upper right hand corner of Figure 4, is a lateral and upward web extension $C^4$ to which may be screwed the stud $C^5$ which is shown in the upper part of Figure 5. This stud $C^5$ is made removable to permit ready access to and ready removal of the recording drum which is shown in Figure 5 and which will later be described. $C^6$ indicates a web portion, shown in Figures 10 and 11, which is bored out and screwthreaded as at $C^7$, to receive the main bearing assembly for a shaft upon which the recording drum is mounted.

The above main bearing assembly includes an exteriorly screwthreaded sleeve D one end of which is inwardly extended as at $D^1$ to provide, on its inner face an inclined ball race $D^2$. The member D is also inwardly screwthreaded as at $D^3$ to receive an exteriorly screwthreaded ball race member $D^4$, with its inclined face $D^5$ opposed to the face $D^2$. $D^6$ is a screwthreaded locking member whereby the member $D^4$ is locked in place. The members $D^4$ and $D^6$ are both channeled as at $D^7$ and $D^8$ to receive the end of a tool. A set screw $D^9$ serves also to prevent rotation of the sleeve D. $D^{10}$ indicate balls of such diameter as to remain in position in the ball race between the opposed walls $D^2$ and $D^5$, regardless of whether or not any shaft or rotary member is interposed within them, as long as the assembly is kept tight and snug. $D^{11}$ indicates the main shaft with reduced ends $D^{12}$, the end shown in Figure 11 being in engagement with the balls $D^{10}$, the shaft being of course out of engagement with the supporting means for the balls and the ball race structure in general.

The main frame or gauge above described is completed by a rear member, which may also be a casting and which is generally indicated as E. It may be described in general as a web structure connecting a number of bosses. It may for example be screwed to the bosses $C^3$ of the member C as by the screws $E^1$. Mounted in a center web $E^2$ is a ball bearing assembly $E^3$ corresponding to the assembly D to $D^{10}$ above described and shown in Figures 10 and 11. The relation of the two ball bearing assemblies will be clear from Figure 8, each end of the shaft $D^{11}$ penetrating one of said ball bearing assemblies. Laterally extending from the web portion $E^2$ is a portion $E^4$, as shown for example in Figures 3 and 4, to which is screwthreaded an adjusting screw generally indicated as $E^5$ and having an enlarged knurled lower head $E^6$. $E^7$ is a lock nut. The head $E^6$ will, when the mechanism is in the position shown in Figure 3, abut against the end of the rod B or against the top of the cross head or cross bar $B^1$, secured to the rod B. Adjustment of the screw $E^5$ serves to adjust the setting of the dial which will later be described, being a factory or permanent adjustment.

In order to prevent lateral movement of the upper end of the rod B and of the weighing structure I provide the following equalizing structure which corresponds to and cooperates with the equalizing lever $B^8$ which controls the bottom of the rod B. The twin levers G, $G^1$ are pivoted as at one end to bosses $G^2$ on the lateral extension $G^3$ of the cross bar $B^1$. At their opposite ends they are pivoted as at $G^4$ to bosses $G^5$ supported on the web structure E. The levers G $G^1$ therefore work in parallel with the lower lever $B^8$, this relationship being clear from Figure 2. The cross bar $B^1$, and thus the rod B, are yieldingly supported by the twin springs H, H. The lower ends of said springs are secured to said cross bar equidistantly from and on opposite sides of the connection between the rod B and the cross bar $B^1$. At their upper ends they are secured to the transverse bar $H^2$ which has forwardly turned end portions $H^3$ pivoted as at $H^4$ to the web structure E for example to the bosses $E^{15}$. Any suitable means may be employed to connect the springs H to the cross bar $B^1$ or to the pivot member $H^2$. I provide, however, hangers $H^5$ for the upper ends of the springs, which loop over the member $H^2$, and perforated pins $H^6$ for the lower ends of the springs, which may be secured to the member $B^1$, as by the set screws $H^7$. The hangers $H^5$ may be employed to vary individually the tension upon the springs H, as the lower ends engage the wire of the spring itself. Therefore, rotation of a hanger in one direction or another will raise or lower its point of contact with the spring, thus increasing or diminishing the spring tension. The tension of the two springs may be unitarily adjusted by adjustment of the position of the member $H^2$, which may be obtained by means of the screw $H^9$ which engages an abutment of the shelf $H^{10}$ on the center web $E^2$ of the member E. This engagement will be clear from Figure 8. Rotation of the screw $H^9$ will raise or lower the member $H^2$ in relation to the shelf $H^{10}$. $H^{11}$ indicates a lock nut. In adjusting the device the springs H should be adjusted in equality and the springs should be so adjusted that at the zero position of the later to be described drum the adjustment screw $E^5$ or its head $E^6$ will just touch the top of the rod B. As the springs give during operation further adjustment may be made by manipulation of the screw $H^9$, the lower adjustment of the screw $E^5$ being undisturbed.

Mounted on the shaft $D^{11}$ is a hub I. It may be pinned to the shaft as by the pin $I^1$, to prevent relative rotation of hub and shaft, one end of this pin projecting outwardly beyond the shaft and hub, as shown in Figure 8. The drum $I^2$ with its cylindrical flange $I^3$ is secured to the hub, as by the screws $I^4$. It will be understood that the cylindrical portion $I^3$ is marked with any suitable weight indicating symbols, as shown for example in Figure 5. $I^6$ indicates a fixed finger for indicating the weight. This finger may be mounted on the hub portion of the web structure E. The hub I supports, by a web structure $I^7$, an assembly $I^8$ which is channeled as at $I^9$ to form a pulley wheel and which is formed at one side with ratchet teeth $I^{10}$, laterally out of line with the pulley wheel. One of the teeth is eliminated or cut down, for a purpose which will later appear, the teeth being otherwise regularly spaced about the rim. $I^{11}$ indicates a gear loose on the shaft $D^{11}$ which is held against axial movement as by the collar $I^{12}$, it being confined between said collar and the end of the hub I. It is provided with a pin $I^{13}$ adapted to engage the outer end of the pin $I^1$, as shown for example in Figure 8, 12, and 13.

K indicates a segment gear in mesh with the gear $I^{11}$. The segment is pivotally mounted upon a plate $K^1$ which, in turn, is pivotally mounted as at $K^2$, upon the web member E. It may for example be provided with an adjusting slot $K^3$, through which passes a securing screw $K^4$. The segment K has associated with it, and formed unitarily therewith, an angle arm $K^5$, with an abutment member $K^6$ extending therefrom. $K^7$ indicates a pin on the web structure E, adapted to limit clockwise rotation of the segment K, as shown for example in Figures 12 or 13. $K^8$ indicates a pin extending from the bar $B^1$, which is adapted to be engaged by the member $K^6$ and to limit the counter clockwise movement of the segment K. Since the bar $B^1$ takes a position which varies in response to the weight upon the weighing platform $A^5$, the position of the pin $K^8$ varies with each difference in weighing. It is worth noting that at each different weight the pin $K^8$ engages the member $K^6$ at a different point along the length of said member. The drum is positioned in response to the angle of movement of the segment K. It is advantageous that the pin $K^8$ and the member $K^6$ should contact at different points for each weight, since this permits an initial factory adjustment to render the weighing accurate, which adjustment may be independently made for the different weights. For example the contour of the member $K^6$ may be varied, by building up or filing off, to render it accurate at all weights, this variation being made in accordance with tests. The member $K^5$ may be laterally extended in any suitable manner, to provide for example an increased bearing $K^{17}$ at the pivotal connection between the member K and the plate $K^1$. This reinforcement is also important in connection with providing a support for a registering cam $K^9$. The member $K^9$ has a cam slot $K^{10}$ which receives a pin $K^{11}$ connected by the arm $K^{12}$ to a shaft $K^{13}$ which controls any suitable indexing device generally indicated as $K^{14}$. It may be mounted for example on the bracket structure generally indicated as $K^{15}$, integral with the plate $K^1$. It will be understood that at each actuation of the scales the movement of the segment serves to actuate the registering device, and indicate the number of coins which should be found in the coin box.

Dead ended on the pulley slot $I^9$ is a flexible support, for example a cable or chain L. The opposite end is engaged or secured to a weight $L^1$ which may be guided by a generally vertical tube $L^2$ which may be supported upon the web structure E. The top of the tube may be slightly bent in as shown at $L^3$ in Figure 8 and is also provided with a set screw $L^4$, adapted to prevent the upward escape of the weight $L^1$ from the tube. It will be understood that the flexible support is wound about the pulley slot or channel $I^9$. The function of the weight is to rotate the drum as far as the mechanism will permit it and the function of the pin $I^{13}$ on the gear $I^{11}$ is to govern or limit the rotation of the drum in response to the weight and also to rotate the drum in retrograde direction, against the weight. As above described, it will be understood that the gear $I^{11}$ is rotated in response to movement of the segment gear K, movement in one direction permitting the weight $L^1$ to rotate the drum $I^2$, and movement in the opposite direction positively moving the drum in the retrograde direction against the gravital effect of the weight. When the segment moves down, referring to the position of the parts in which they are shown for example in Figure 4 it winds up the weight. When the segment rises, the weight pulls the drum around, the pins $I^1$ and $I^{13}$ serving as the limit. In order to prevent undue oscillation of the drum a leaf spring $I^{15}$ may be employed one end of which is secured to the web structure E, the other engaging the rim $I^8$. The result is a frictional damping contact. The rim is cut away as at $I^{16}$, to correspond with the zero position of the drum or dial, and at that position the frictional contact with the spring $I^{15}$ is eliminated. This permits an easy start and prevents initial locking or resistance against movement of the drum.

M generally indicates a coin chute structure which may be secured to the frame E for example at $M^1$ by a screw $M^2$. Another screw $M^3$, passing through the ear $M^4$, serves to secure the coin chute assembly M to the interior of the main frame or housing. The chute M may include a member $M^5$ extending from the coin slot $M^6$ to the final bottom coin discharge $M^7$. Members $M^8$, may be secured to it, as by the screws $M^9$. As is shown in Figure 6 there are two members $M^8$ which are separated by a hinged wall portion $M^{10}$ rotatable about the pivot pin $M^{11}$ normally urged, as by the spring $M^{12}$, to closed position. It may be opened from without the housing, as by employment of the pin $M^{13}$ with its exterior knob $M^{14}$. The inner end of the pin $M^{13}$ passes through an ear $M^{15}$ and is positioned in relation thereto, as by the pins $M^{16}$, as shown for example in Figure 7. The hinged wall member $M^{10}$ is provided with a side opening $M^{17}$ of such size as to permit the passage therethrough of articles smaller than a coin of a predetermined minimum size. A leaf spring $M^{18}$ is indicated, which tends to throw such coins outwardly through the opening $M^{17}$. The members $M^5$ and $M^8$ are provided with a longitudinal slot $M^{20}$ the purpose for which will later appear.

As the coins pass downwardly through the above described coin slot structure and pass the apertures $M^{20}$ each coin, as shown for example in Figure 9, engages the trip member generally indicated as O, which may be a thin rod or wire offset from the horizontal wire or rod portion $O^1$ which can be seen for example in the upper portion of Figures 3 and 4. The rod $O^1$ is rotatably mounted on the web structure E for example in slots $O^2$ in the bosses or projections $O^3$, provided with cover clips $O^4$. The opposite end $O^5$ of the trip member or wire extends forwardly beneath a trip lever or bar $O^6$. It normally keeps the wire O $O^5$ in the full line position in which it is shown for example in Figure 9. The lever $O^6$ is pivoted as at $O^7$ on the web member E, intermediate its ends. At the left hand end of the lever $O^6$, in the position in which it is shown for example in Figures 12 and 13 is a lateral angular extension $O^8$. $O^9$ indicates a pin which is adapted to be engaged by the end projection $K^{20}$, of the segment K as shown for example in Figure 13. Referring to the lever in the position in which it is shown in Figures 12 and 13 its counter clockwise movement about its pivot is limited by the abutment $O^{10}$ formed in the web structure E. Pivoted to the lever $O^6$ as at $O^{11}$ is a sub-lever $O^{12}$ which has a terminal angular offset $O^{13}$ extending outwardly in an opposite direction from the angle member $O^8$ of the lever $O^6$. It is adapted to engage the ratchet teeth $I^{10}$. In order to limit the movement of the small lever $O^{12}$ I may provide, as stop means, a pin $O^{14}$ on the smaller lever, penetrating the aperture $O^{15}$ in the larger lever $O^6$.

P generally indicates an escapement member pivoted as at $P^1$ to the web member E. It has an edge portion $P^2$ which in the device in the neutral position is normally engaged by the angle $O^8$ of the lever $O^6$, as shown for example in Figure 13. The anti-clockwise rotation of the member P is thus limited by the portion $O^8$ which serves as a stop. The member P includes a tail piece $P^3$ and a lateral extension $P^4$ which carries a pin $P^5$. $P^6$ indicates generally an escapement lever which is rotatable also about the pivot $P^1$ of the escapement P, but which is provided with a slot $P^7$ to permit also its longitudinal movement in relation to the pivot point. $P^8$ indicates a spring connecting the outer end of the tail piece $P^3$ with the lever $P^6$ which tends normally to hold the parts in the position in which they are shown in Figure 3. $P^9$ indicates a cam indentation in one edge of the lever $P^6$, adjacent the pin $P^5$. In the normal position in which the parts are shown in Figure 3 the pin $P^5$ penetrates the cam aperture $P^9$ and also acts as a stop for preventing lengthwise clockwise movement of the lever $P^6$. The lower end of the lever is shown as provided with ratchet teeth as at $P^{10}$. Above the teeth $P^{10}$ is another cam indentation or portion $P^{11}$. It is in alignment with and may be engaged by a pin $P^{12}$ fixed upon the web portion E, as shown for example in Figure 12. $P^{13}$ is a guide, secured to the web portion E, to hold the lever $P^6$ in the plane of its movement. The teeth $P^{10}$ are adapted to be engaged by a member $P^{14}$ fixed upon the cross bar $B^1$.

The rod B is guided in a tube S which is held in relation to the top plate $S^1$, as by the screw $S^2$, the plate $S^1$ resting upon lugs $S^3$ inwardly projecting from the main housing $A^1$. The plate $S^1$ is also apertured to permit the extension therethrough of the lower end of the coin chute at $M^7$ as shown for example in Figure 4. The space beneath the plate $S^1$ and exterior to the rod S is adapted to receive and permit the passage of the coins which are received, at the bottom, upon the inclined plate $S^4$. The lower end of the tube S passes through the plate $S^4$ and is secured thereto by the screw $S^5$. The door $A^2$ gives access to the coin chamber so formed and permits the removal of the coins therefrom. The upper end of the tube S serves also as an abutment to limit the downward movement of the member or cross piece or cross bar $B^1$. This limit may be set for example as at a complete rotation of the dial, which may if desired indicate 300 points. In any case, when an excess weight is applied to the table $A^5$, the engagement between the member $B^1$ and the top of the tube S prevents straining or disengagement of the various removing parts of the weighing mechanism.

The top of the housing $A^1$ is provided with a unitary top plate generally indicated as $A^4$. This plate $A^4$ is penetrated by the coin slot $M^6$. It is also provided with an upper inclined mirror $T^1$, which may be inset in or secured to the plate T to be removed from the scales unitarily therewith. The plate $A^4$ as a whole may be held in place for example by the interior screws $T^2$ which penetrate bosses $T^3$ in the plate $A^4$ which bosses seat in apertures in the ribs or flanges $T^4$ of the housing $A^1$. $T^5$ indicate any suitable washers. The plate $A^4$ is provided with an additional aperture $T^6$ in the bottom of which is seated a magnifying lens $T^7$. This lens may for example be an ordinary magnifying lens in which opposite peripheral portions have been cut or ground as at $T^8$. Preferably the lens is of such nature that it not only magnifies the figures on the cylindrical portion $I^3$ of the drum $I^2$, but makes it impossible for an observer to one side readily to see the symbols. In other words the user of the scale can easily see the figures on the scale but privacy is maintained by the difficulty with which an observer to the front, side or rear of the user can see the figures. The lens is practically straight or flat on the bottom and is curved on the top and the result is that to an observer standing at any point except upon the platform $A^5$, the figures are out of focus. Also the depth of the aperture $T^6$ at the bottom of which the lens is positioned makes it difficult for an unintended observer to see the figures.

It will be realized that whereas I have described and shown a practical and operative device, nevertheless many changes may be made in size, shape, number and disposition of parts without departing from the spirit of my invention. I therefore wish my description and drawings to be taken as in a broad sense illustrative and diagrammatic rather than as limiting me to my specific showing.

The use and operation of my invention are as follows:

The operator or customer stands upon the platform $A^5$ and, either before or after he stands on the platform, inserts a coin in the slot $M^6$. Assuming that the coin is of proper size and weight it passes downwardly through the coin guide and into the coin receiving chamber in the housing $A^1$. As it passes down the guide and past the slots $M^{20}$ it engages the wire O and moves it in counter-clockwise direction, referring to the position of the parts as shown in Figure 9. Thereupon the crank portion $O^5$ lifts the lever $O^6$, the parts being moved by the coin into the dotted line position as shown in Figure 9. The lever $O^6$ being lifted into the position in which it is shown in Figure 4, the weight of the escapement lever $P^6$ swings the escapement member into the position in which it is shown in Figure 4, with the portion $P^2$ extending under the terminal angular portion $O^8$ of the lever $O^6$. As the wire $O^5$ drops, the coin having passed on, the lever $O^6$ is held in the position in which it is shown in Figure 4 being seated in the recess $P^{20}$ above the portion $P^2$ of the member P. The upward movement of the lever $O^6$ moves the small sub-lever $O^{12}$ and its offset portion $O^{13}$ out of engagement with the ratchet teeth $I^{10}$, it being shown in this position in Figure 4. Therefore the hub I and with it the drum $I^2$ are released for rotation. It will be noted that this release may take place either prior to or after the user stands upon the scale platform $A^5$. In other words the user may insert his coin either before or after he gets on the platform, a point wherein the present scale differs from the scales in the past. As the escapement lever $P^6$ swings counter-clockwise for example into the position in which it is shown in Figure 4, the teeth $P^{10}$ engage the abutment $P^{14}$ on the member $B^1$. In case the coin is inserted before the operator stands on the platform $A^5$ the abutment $P^{14}$ will engage the escapement lever $P^6$ above the teeth and in the form herein shown a weight of about forty pounds on the platform is necessary in order to engage the teeth with the abutment $P^{14}$. Assuming that the user is standing on the platform $A^5$, the cross head member $B^1$ is depressed to a point where the abutment $P^{14}$ does engage the teeth $P^{10}$. The depression of the member $B^1$ lowers also the pin $K^8$, which is mounted upon it and the depression of this pin permits the member $K^6$, and with it the segment gear K to rotate counter-clockwise until the member $K^6$ again strikes the pin $K^8$. The leverage of the pin $K^8$ varies of course with the weight of the person being weighed, the heavier the person the lower the pin $K^8$ will be, and the greater will be the arc of movement of the segment gear K. The segment K rotates in response to its own weight, its weight being concentrated on one side of its axis of rotation. It therefore is effective to rotate the gear $I^{11}$, in turn, through the engagement of the pins $I^1$ and $I^{13}$, rotates the hub I and with it the indicating drum. This rotation also winds up the weight $L^1$. The user reads the weight through the lens $T^7$, the weight being indicated by that figure or symbol on the drum portion $I^3$ which is aligned with the indicating finger $I^6$.

When the user gets off the platform $A^5$ the springs H draw the cross head $B^1$ back to its original position and the pin $K^3$ raises the segment K into its original position, while the weight $L^1$ rotates the drum back to neutral position. As the member $B^1$ rises it also lifts the abutment $P^{14}$ in engagement with the teeth $P^{10}$ and therefore lifts the escapement lever $P^6$. Longitudinal movement of the lever is permitted by the slot $P^7$. As it lifts, the cam portion $P^9$ of the escapement lever $P^6$ engages the pin $P^5$ and rotates the escapement member P clockwise, referring to Figure 12.

This moves the recess P20 of the escapement lever out of contact with the portion O8 of the lever O6 and permits the lever to drop into the position in which it is shown in Figure 12 or Figure 3, its rotation being limited by the abutment O10. The sub-lever O12 is then free to engage the ratchet teeth I10. The portion O13 of the lever O12 overrides the ratchet teeth, permitting return of the drum to neutral position, but preventing retrograde movement of the drum to indicating position. As the escapement lever P6 continues to lift it is forced outwardly or to the left, referring to the position of the parts in Figure 12, by the engagement of the pin P12 with the cam member P11.

In case a child weighing less than 40 pounds is weighed, the abutment P14 does not engage the teeth P10 and therefore will not serve to raise the escapement lever P6. However, in such case the retrograde rotation of the segment gear K causes its end K20 to engage the pin O9 on the lever O6, and kicks the angular extension O8 out of engagement with the notch P20, and permits it to drop into the position in which it is shown in Figure 13. This prevents any subsequent use of the scales until another coin is deposited, regardless of the weight of the user. When the device is in neutral position the pin O9 does not normally contact the portion K20 of the segment, but when the weight is released, the rebound of the mechanism is enough to carry it beyond the neutral position to effect the desired contact and to release the lever O6. Further movement of the segment in clockwise direction is limited by the stop pin K7, as shown for example in Figure 13.

Any suitable means may be employed, in association with the segment K, for recording the number of coins which have been deposited. I illustrate for example the cam member K9 with the cam slot K10 which engages the pin K11 and actuates the crank K12 of the recording device K14.

The gate M10 of the coin chute may be actuated from without, through the pin M13, in order to free any oversized articles which may have been stuffed into the coin slot. For example if paper has been stuffed in it can be freed without making it necessary for the operator to open the rear closure of the device. Anything which drops is kept from the penetration of the coin department, and drops upon the plate S1.

As the springs lengthen in use the factory adjustment obtained through the screw H5 may be supplemented by actuation of the additional and upper adjusting screw H9.

I claim:

1. In a scale structure, a base, a weight receiving member associated with said base, weight indicating means and actuating means therefor, and a connection between the weight receiving member and said actuating means, said actuating means including a rotatable shaft, a gear on said shaft, a segmental gear in mesh with said first mentioned gear and pivoted adjacent said shaft, and stop means adapted to limit the rotation of said segmental gear, said stop means being movable in response to movement of the weight receiving member, said segmental gear being provided with a unitarily formed stop contacting member, escapement mechanism for controlling movement of the indicating means to and from zero position and cooperative means carried by the segmental gear and escapement mechanism for actuating the latter to engage the indicating means and maintain the same in zero position after a weighing operation.

2. In a scale structure, a base, a weight-receiving member associated with the base, indicating mechanism, actuating means therefor responsive to movements of the weight receiving member, escapement mechanism for controlling movement of the indicating means to and from zero position, plural means for selectively actuating the escapement mechanism whereby the escapement mechanism locks the indicating mechanism against movement from zero position after each weighing operation, each escapement actuating means being selectively responsive to a predetermined weight on the scale.

3. In a scale structure including a movable weighing platform, indicating mechanism, and actuating mechanism for moving the indicating mechanism in response to movements of the platform, weight actuated mechanism including a member mounted for reciprocation in response to movements of the platform, and means for restraining said last-mentioned member against lateral oscillation including a pair of spaced levers mounted for pivotal movement about fixed points adjacent to the opposite ends of said member, said levers having their free ends operatively connected to opposite ends of said member, the points of connection between said levers and said member being remote from the pivot points of said levers and said member being disposed between the pivot points of said lever and the free ends thereof whereby to restrain said member against lateral oscillation while permitting free longitudinal reciprocation thereof.

4. In a scale structure including a movable weighing platform, an indicating member and connecting means between the platform and indicating means for actuating the latter, said actuating means including a longitudinally movable link member and bars connected to the link at opposite ends thereof and extending transversely of the link, the combination with said link and connecting bars, of means to restrain said link against lateral movement while permitting free longitudinal movement thereof, comprising a pair of spaced levers mounted for pivotal movement about fixed points adjacent to opposite ends of said link, said levers being disposed to swing in planes parallel to the plane of movement of the link, the free ends of said levers being pivotally connected to the transverse bars carried by the link, and the point of connection between the link and bars lying intermediate the points of connection between the bars and said levers, and the pivot points of said levers.

DAVID C. ROCKOLA.